US011936425B1

(12) United States Patent
Jim et al.

(10) Patent No.: US 11,936,425 B1
(45) Date of Patent: Mar. 19, 2024

(54) DEVICES, SYSTEMS, AND METHODS FOR LASER-BASED COMMUNICATIONS

(71) Applicant: Oceanit Laboratories, Inc., Honolulu, HI (US)

(72) Inventors: Kevin T. C. Jim, Honolulu, HI (US); Michael Hadmack, Honolulu, HI (US); Ishan Mons, Honolulu, HI (US); Jonathan Ryan K. H. Leong, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 72 days.

(21) Appl. No.: 17/324,020

(22) Filed: May 18, 2021

(51) Int. Cl.
*H04B 10/112* (2013.01)
*H04B 13/02* (2006.01)

(52) U.S. Cl.
CPC ......... *H04B 10/1121* (2013.01); *H04B 13/02* (2013.01)

(58) Field of Classification Search
None
See application file for complete search history.

(56) References Cited

U.S. PATENT DOCUMENTS

| | | | | |
|---|---|---|---|---|
| 5,390,040 A * | 2/1995 | Mayeux | ............... | H04B 10/118 250/234 |
| 9,490,911 B2 | 11/2016 | Hopewell | | |
| 2014/0161466 A1 | 6/2014 | Riza | | |
| 2015/0244458 A1 * | 8/2015 | Erkmen | ............. | H04B 10/1125 398/122 |

OTHER PUBLICATIONS

Zhaoquan Zeng; Shu Fu; Huihui Zhang; Yuhan Dong; Julian Cheng, A Survey of Underwater Optical Wireless Communications, First Quarter 2017, IEEE Communications Surveys & Tutorials, vol. 19, No. 1, pp. 204-237 (Year: 2017).

* cited by examiner

*Primary Examiner* — David W Lambert
(74) *Attorney, Agent, or Firm* — Fresh IP PLC; Clifford D. Hyra; Aubrey Y. Chen

(57) ABSTRACT

Systems, devices, and methods for laser-based communications are disclosed. At least one embodiment relates to laser-mediated underwater communications, in which one or more laser signals transmit encoded information from a transmitter to a receiver. Additionally, an underwater transmitter node sends information to an underwater receiver node using one or more lasers. At least an additional embodiment relates to laser-based communications that may be used to send information across a variety of media (e.g., air, water, etc.). Specifically, a first and a second communications system each sends a laser beam to the other. Each communications system further includes a position sensitive detector (PSD) that obtains positioning and/or steering information of an incoming laser beam and ensures that the positions of both the outgoing laser beam and the incoming laser beam match.

19 Claims, 12 Drawing Sheets

DEVICES, SYSTEMS, AND METHODS FOR LASER-BASED COMMUNICATIONS

FIELD OF THE INVENTION

The application relates generally to systems, devices, and methods for laser-based communications. In particular, the application relates to utilizing one or more lasers for transmitting and receiving data, including encoded data.

BACKGROUND

Laser-based communications are used in a variety of industries and for a variety of uses, including, for instance, oil and gas operations, ship operations underwater, diving, submarine operations, autonomous underwater and surface vehicles, seismic monitoring, laying and monitoring communications cables, oceanographic research, military research and operations, and monitoring underwater infrastructure.

However, current systems, devices, and methods for underwater communications are complex, hard to scale, and expensive. In addition, they are often unable to effectively communicate and reach their intended targets.

Given the foregoing, there exists a significant need for new systems, devices, and methods capable of allowing for effective laser-based communications, especially encoded communications, through a variety of media (e.g., air, water, etc.).

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, embodiments of the present invention are directed to devices, systems, and methods for transmitting information using laser beams or other types of transmitted radiation. The invention in at least one embodiment comprises an underwater transmitter node that sends information to an underwater receiver node using one or more lasers. The one or more lasers may be focused on to the underwater receiver node using a lens, telescope system, or the like. Additionally, the invention in its various embodiments may be automated such that the one or more lasers can be operated automatically to transmit information in an easy and efficient way without in-depth knowledge of lasers and optics. One of skill in the art will recognize that current systems do not focus energy, but rather attempt a wide-beam approach. Such an approach suffers from numerous drawbacks, including, but not limited to, inability to efficiently and conveniently transmit information.

In one or more embodiments of the present invention, the one or more lasers have a wavelength in the blue-green portion of the visible spectrum (400-530 nm), thereby enabling the one or more lasers to transmit effectively through various media, including, but not limited to, air, water (e.g., ocean water), etc.

In some embodiments of the invention, the information transmitted between the underwater transmitter node and the underwater receiver node is an encoded digital transmission. It should be appreciated that two or more different encoding schemes are possible for a given transmission. It should further be appreciated that the communication between the underwater transmitter node and the underwater receiver node may be unidirectional or bidirectional. These encoding schemes are well-known in the art, including, but not limited to, quadrature amplitude modification or on-off keying.

At least one embodiment of the invention comprises the use of one or more lasers having wavelengths in the range of 400-530 nm. These one or more lasers optimally transmit through ocean water. One of skill in the art will appreciate that there may be one or more optimal wavelengths for transmission, depending on the exact composition of the water, including, for instance, the number and type of biological and/or plant species present in that water, which impacts the specific wavelengths of light absorption. The optimal wavelength for a given body of water at a given time may be determined experimentally.

Purely as a non-limiting example, FIG. 1 illustrates the result of one laser having a wavelength of 450 nm transmitting through water of various compositions, which is near, or at, the peak transmission point for certain sea water conditions. Although some light from the laser is reduced through the water column, the light is detectable up to a certain range, thereby enabling digital transmission via the laser. Although various embodiments of the invention are described herein with reference to one or more lasers having a wavelength of 450 nm, such disclosure should not be interpreted in a limiting sense. Depending on the conditions and/or composition of the water through which communications are necessary, lasers with more than one wavelength may be used, including, for instance, 475 nm.

Some embodiments of the present invention utilize narrow-band lasers in focused, narrow-area transmissions. A skilled artisan will appreciate that wide-area transmissions intrinsically limit both data rate and range, and also increase power requirements of the one or more lasers used. Such a skilled artisan will further appreciate that, in the current state of the art, no devices or systems focus energy from lasers to enable underwater communications. The present invention in its various embodiments enables such communications with, for instance, one or more lasers transmitting in a wavelength of 400-530 nm.

At least one embodiment of the invention comprises a system that uses 5-4 encoding and is further capable of using a variant of quad-division multiplexing and multiple wavelengths of one or more lasers in order to increase bandwidth. Such a system may include, for instance, modulated retroreflectors and adaptive optics. APDs may be used rather than PIN diodes.

The present invention in various embodiments further comprises a standard 100Base-FX encoding scheme operating at 31.25 MHz, and transmitting at 100 Mb/s through water for over 30 m.

The present invention in at least one embodiment may additionally comprise automated search and track systems employing modulation of laser power level and beam focusing. One such embodiment is depicted herein in FIGS. 3A-3B, which illustrate a tracking system that has a pressure housing containing the actual laser, a gimbal mirror, a dichroic separator, a beam splitter, an optical receiver, and a position sensitive detector (PSD) (e.g., a quad cell).

In further embodiments, the invention enables laser-based communications in a variety of media (e.g., air, water, etc.). The invention in various embodiments comprises one or more communications systems, each communication system having at least one transmitter configured to transmit information via one or more laser beams. Thus, each transmitter may comprise one or more lasers, wherein the transmitters and/or the lasers must be precisely pointing at each other in order for such information transmittal to occur. In an exemplary embodiment, there are two communications systems, each system comprising one transmitter with one laser. The first communication system transmits its laser at the second communication system, and vice versa. A skilled artisan will appreciate that such communication systems are often subject to disturbances that interfere with the ability to precisely point a transmitter and/or a laser at another transmitter and/or laser. Such disturbances cause the relative alignment of the transmitted radiation/laser beam between the communication systems to change over time. Non-limiting examples of these disturbances include, for instance, the medium (e.g., air, water, etc.) between the communications systems, the relative distance between the communications systems, changing of the relative alignment of each communications system, and the like. Active control of the relative pointing between the communications systems is commonly employed to counteract the disturbances. However, in the current state of the art, the control signals necessary for such active control are sent between the various communications systems, which requires an inter-system relay of these control signals, thereby utilizing valuable communications bandwidth.

Accordingly, embodiments of the invention comprise local controls on one or more communications systems that enable active control of the relative pointing of the communications system to one or more other communications systems without the need to send control signals between communications systems. In at least one embodiment, depicted in further detail herein in FIG. 8, one or more communications systems comprise a Position Sensitive Detector (PSD) that is configured to detect relative alignment between the associated communications system and another communications system transmitting a laser signal or other information-transmitting radiation. Each PSD generates signals from which control signals can be derived; these control signals are configured to adjust the angle of one or more steering elements (e.g., mirrors) that contact the incoming and/or outgoing laser beams. Thus, by controlling such steering elements, the laser beam transmitted by a given communications system can be adjusted to precisely point at another laser beam being transmitted by another communications system.

In at least a further embodiment, the positioning and/or steering information for a first communications system's incoming laser beam is transmitted "geometrically" to the second communications system by steering the first communications system's transmitted laser beam. Such transmission is "geometric" in that the positioning and/or steering information is not sent over a data link, but rather based on sensing of movement of the laser beam. Specifically, any movement of the laser beam sent from the first communications system is detected by the second communications system (e.g., by the PSD of the second communications system), which then enables the second communications system to move its laser beam. Thus, this "geometrical" steering information is received by the second communications system, which then uses this information to steer its own laser beam back at the first communications system. The first communications system steers the beam from the second communications system with this "geometric" information without the need to send positioning and/or steering information over the data channel. A non-limiting example is shown in greater detail herein in FIG. 9, wherein position sensors receive positioning and/or steering information of incoming laser beams. Such position sensors may be, for instance, one or more PSDs as described above herein.

In additional embodiments, one or more communications systems comprise a plurality of steering mirrors for steering incoming and/or outgoing laser beams. Actuation of the steering mirrors on each communications system is coupled together so that steering of both an incoming and an outgoing laser beam happen in the same direction. The beams can be steered by, for example, using information about offsets detected by position sensors (e.g., one or more PSDs).

One of skill in the art will appreciate that one or more communications systems may, alternatively, comprise only a single steering mirror for steering both incoming and outgoing laser beams. The communications system may comprise a dichroic beam splitter in order to separate both the incoming and outgoing laser beams. Such a dichroic beam splitter therefore allows both the incoming and outgoing laser beams to overlap. However, the beam transmitter may be positioned so that the incoming and outgoing laser beams do not overlap, in which case, spatial separation enables the single steering mirror to steer both laser beams without overlap. A non-limiting example is shown in FIG. 10 herein.

One of skill in the art will appreciate that the instant invention is therefore useful for laser-based communications in a variety of fields and use situations, including, for instance, offshore operations and communications for oil and gas companies, offshore and underwater military communications, telecommunications cable companies and operators, and academic oceanographic research.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
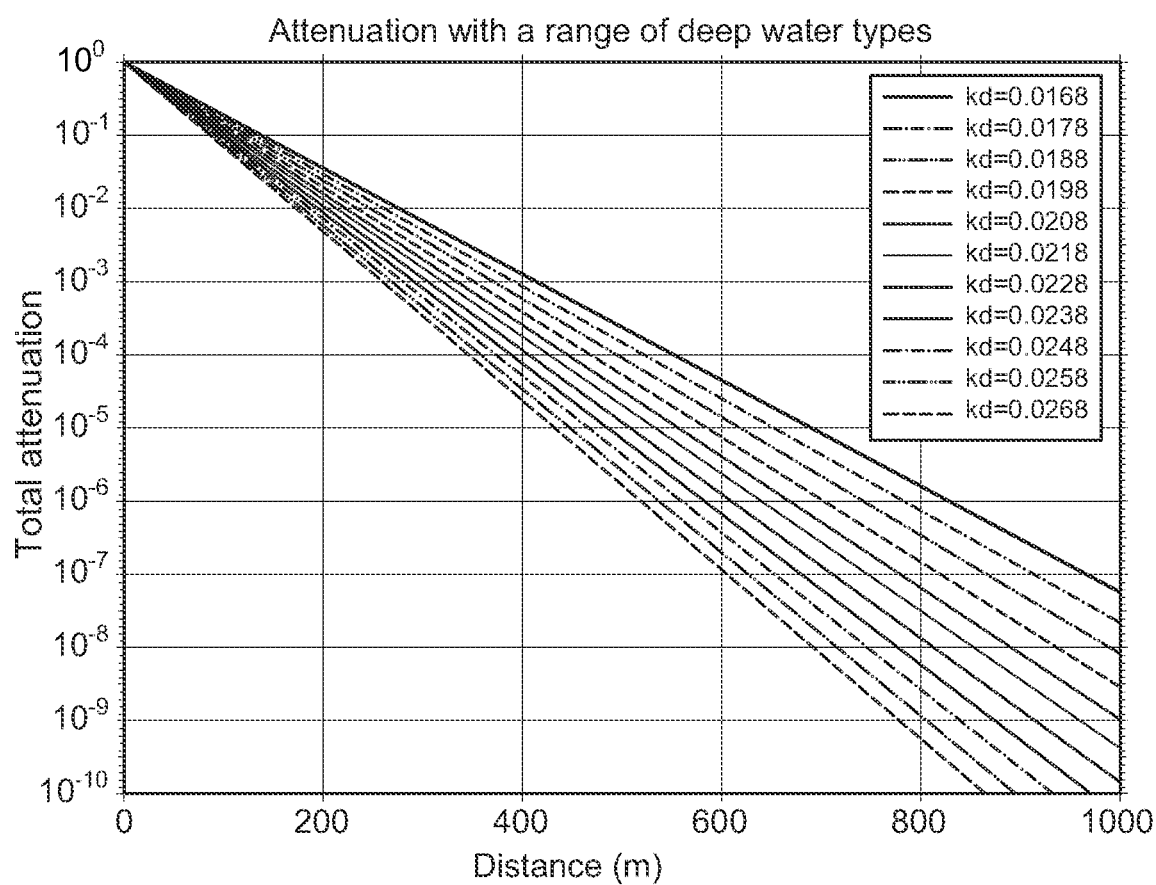
FIG. 1 is a graph showing attenuation of light at a wavelength of 450 nm through different water types, which are defined through their respective attenuation coefficients in units of $m^1$, according to an embodiment of the present invention.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Generally, the present invention is directed to devices, systems, and methods for transmitting information underwater. In particular, the invention in various embodiments comprises an underwater transmitter node that sends information to an underwater receiver node using one or more lasers. The one or more lasers may be focused on to the underwater receiver node using a lens, telescope system, or the like.

Some embodiments of the instant invention comprise both unidirectional and bidirectional transmission of data and/or information via one or more lasers.

It should be appreciated that data transmitted between the underwater transmitter node and the underwater receiver node may be in the form of an encoded digital transmission. It should further be appreciated that one, or more, different encoding schemes are possible for a given transmission.

Accordingly, at least one embodiment of the present invention comprises a system that uses 5-4 encoding and is further capable of using a variant of quad-division multiplexing (e.g., quadrature amplitude modification (QAM) and its sub-variants, which depend on the number of bits per symbol being transmitted) and multiple wavelengths of one or more lasers in order to increase bandwidth. Specifically, multiple lasers are used to increase bandwidth by running them in parallel. Encoding methods such as, for instance, QAM-16, QAM-32, or QAM-64 are used to pack more bits into each transmitted symbol. Such a system may additionally include, for instance, modulated retroreflectors and adaptive optics. All of the above encoding methods are well-known for radio frequency (RF) and laser communications systems.

The invention in its various embodiments may further comprise a standard 100Base-FX encoding scheme operating at between 31.25 MHz and 62.5 MHz, and transmitting at 100 Mb/s through water for over 30 m. Although such an encoding scheme is generally well-known in the art, it should be appreciated that currently-available devices and systems are unable to use this or other encoding schemes for laser-based communications through water, and especially not in an autonomous or semi-autonomous fashion. For example, currently-existing free space air communication systems require careful manual alignment, while the present invention in its various embodiments removes the need for such manual alignment while maintaining tight beam functionality.

Further embodiments may additionally comprise automated search and track systems employing modulation of laser power level and beam focusing.

One of skill in the art will recognize that the one or more lasers in the present invention may have a wavelength in the blue-green portion of the visible spectrum, thereby enabling the one or more lasers to transmit effectively through water, including, for instance, ocean water.

A non-limiting example of a laser transmitting light at a wavelength of 450 nm through different water types is shown in FIG. 1. Each of these water types on the graph is defined via its respective attenuation coefficient, in units of $m^{-1}$. The lines represent different types of sea water conditions. As can be seen in FIG. 1, the ability of a given laser operating at 450 nm to transmit light through water is dependent on the specific type of water through which that light is transmitted. One of skill in the art will appreciate that such dependency is not limited to a laser operating at 450 nm. Detection down to 0.1% ($10^{-3}$) transmission or lower is possible, depending on the sensitivity of the detectors used.

It should additionally be appreciated that different bodies of water, as well as different portions of water columns within the same body of water, may have different impacts on the transmission ability of a given laser. Such differential impacts may depend on, for instance, the exact composition of the water, as well as the number and type of biological and/or plant species present in that water. These differences produce different types of water that can be classified according to the Jerlov classification scheme. The optical properties of different Jerlov water types are known to those of skill in the art.

Transmission of a message via one or more lasers may either unidirectional or bidirectional. Purely as a non-limiting example, an underwater transmitting node, which may comprise one or more lasers, may transmit data to an underwater receiving node in a unidirectional way. At minimum, however, only one laser is needed to transmit unidirectionally. There are at least two methods for transmitting data in a bidirectional way. First, one or more lasers can be present on both the transmitting end and the receiving end. Second, a laser may be located at one location such as, for example, the transmitting location, and a modulating retroreflector may be located at another location such as, for instance, the receiving location. The modulating retroreflector changes the signal sent by the laser as it returns that signal to the original transmitting location. A photodiode may also tap part of the signal from the retroreflector in order to receive transmissions from the laser.

Figure 2:
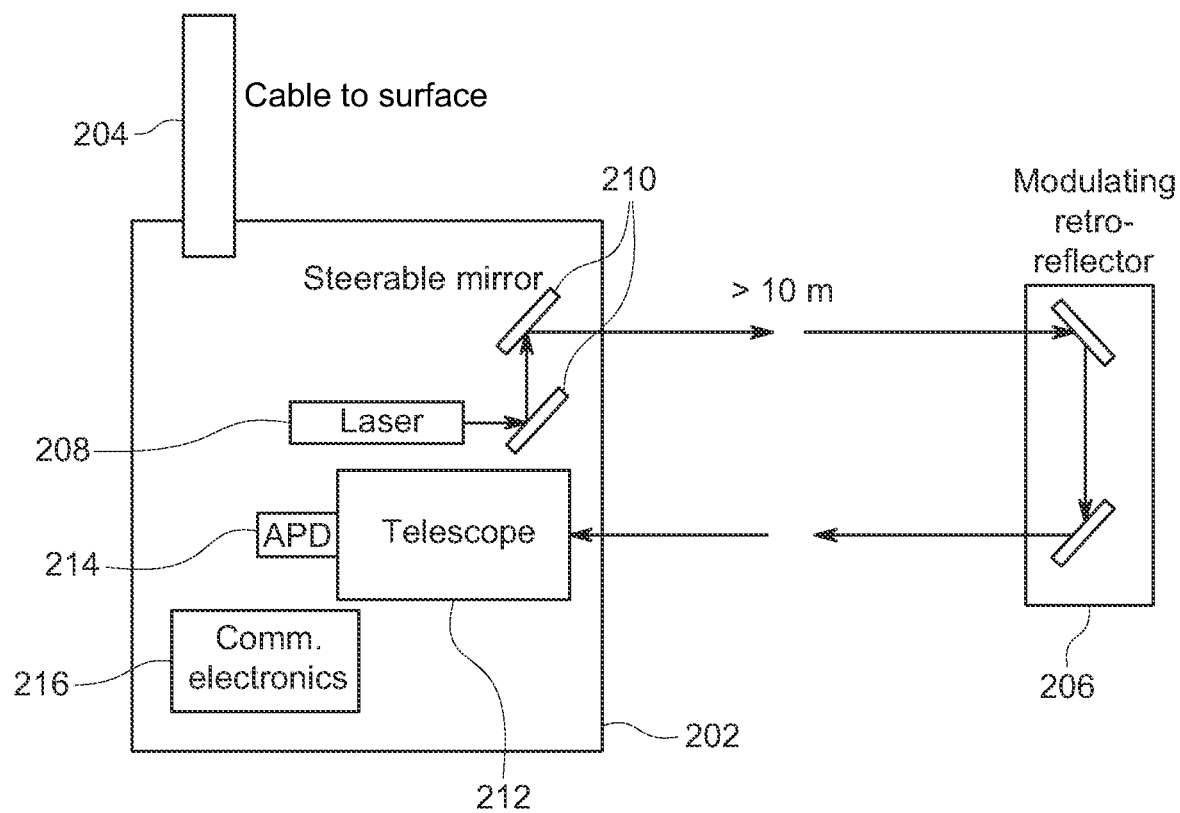
FIG. 2 is a schematic diagram illustrating an embodiment of the present invention comprising, in part, a modulating retroreflector and a telescope for receiving the laser-generated transmission.

A non-limiting example of a two-way communication system with a modulating retroreflector is shown in further detail in FIG. 2. The two-way communication system comprises a transmission subsystem 202 that is underwater, a surface cable 204 that connects the transmission subsystem to the surface of the water, and one or more modulating retroreflectors 206.

The transmission subsystem 202 itself comprises a laser 208 that emits a beam to one or more steerable mirrors 210. The beam transmits data and/or information that may be encoded. The steerable mirrors 210 then direct the beam to the one or more modulating retroreflectors 206, which may be 10 m or more from the transmission subsystem 202. A photo-diode (not shown) may be in complex with the one or more modulating retroreflectors in order to tap the beam sent by the laser 208 (i.e. read the signal from the laser at the retro-reflector location).

The one or more modulating retroreflectors receive the beam from the laser 208 and then redirect the beam back to the transmission subsystem. A telescope 212 in the transmission subsystem receives the beam that is redirected back from the one or more modulating retroreflectors, thereby enabling the transmission subsystem to also receive data in addition to transmitting data. An APD (avalanche photodiode) 214 may be complexed with the telescope. Such an APD is a tunable sensitivity photodetector capable of applying multiplicative gain to an incoming optical signal. Using such an APD over a standard photodiode results in an increase in the maximum range of the system and/or the maximum attenuation the system can tolerate.

The transmission subsystem may also comprise communication electronics 216. These communication electronics convert incoming optical signals into copper network traffic, as well as handle intersystem communication (i.e., communication between components of the system). The communication electronics 216 further control the network stack and ensure that all data on the network arrives at its intended location.

A skilled artisan will appreciate that the one or more modulating retroreflectors 206 may be replaced by a second transmission subsystem (not shown) that is identical to the transmission subsystem 202. As a result, this second transmission subsystem comprises, in part, a second laser. The second laser operates at either the same wavelength as the laser 208, or a different wavelength to reduce the effects of backscatter from the laser 208. Non-limiting examples of these different wavelengths include 450, 475, 487, and 515 nm. It should be appreciated that the laser 208 and/or the second laser may be gated to reduce the backscatter effect(s), a principle well-known in the art as "range gating". It should further be appreciated that the laser 208 would not transmit data at the same time as the second laser.

Figure 3A:
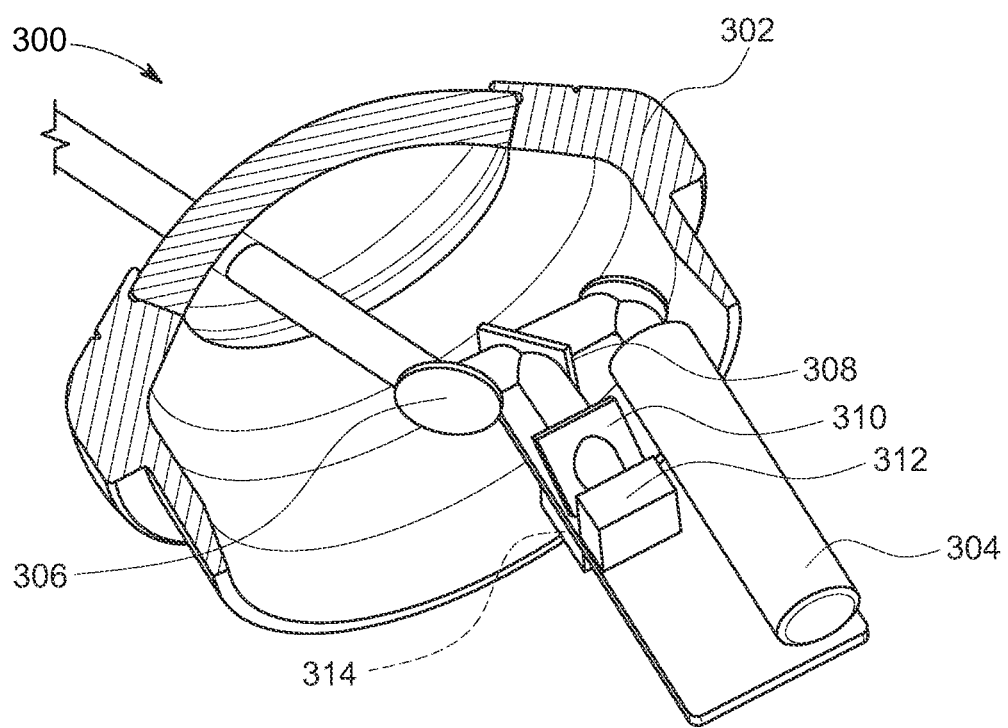
FIGS. 3A-3B illustrate an automated tracking system according to an embodiment of the present invention.

Embodiments of the present invention further include automated search and track systems employing modulation of laser power level and beam focusing. FIG. 3A depicts a non-limiting example of such a track system 300. The system 300 has a pressure housing 302 containing various components, including the actual laser 304 used for underwater communications (which may, in at least some embodiments, comprise multiple lasers transmitting and/or receiving at different wavelengths), a gimbal mirror 306, a dichroic separator 308, a beam splitter 310, an optical receiver 312, and a quad cell 314.

The gimbal mirror 306 is used to control the pitch and yaw of the system 300. The dichroic separator 308 can be used to separate different lasers based on their color; that is, separation of lasers that are transmitting and/or receiving at different wavelengths. The beam splitter 310 reflects a portion (e.g., half) of received energy (e.g., from another laser transmitting information from another system) into a position detector, which can be the quad cell 314 or a lateral effect or other type of position-sensing detector, and transmits another portion (e.g., the other half) of the received energy to the optical receiver 312 that generates the communication signals. The quad cell, or other type of position-sensing detector, provides pointing feedback to the gimbal mirror to maintain linkage between the system 300 and other remote system(s).

Figure 3B:
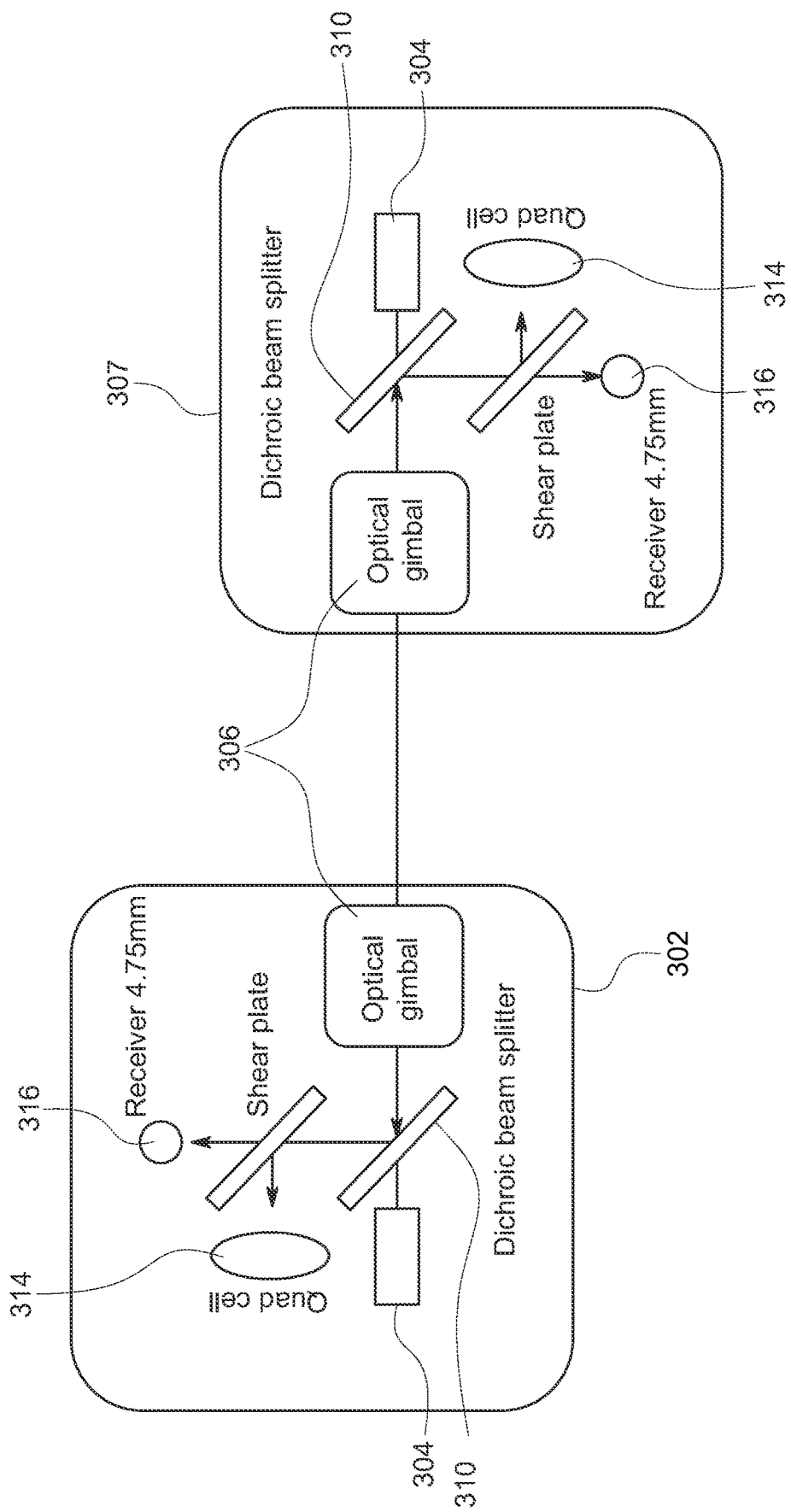

FIG. 3B depicts a further non-limiting example of a track system in the context of an underwater laser communications system according to at least one embodiment of the present invention. A first underwater laser communications module 302 comprises a first laser 304 that sends laser-based information, via its beam, through a first gimbal mirror 306, and then through a second gimbal mirror 306 located in a second underwater laser communications module 307. The beam from first laser 304 then passes through a beam splitter 310 in this second module, and is received by both the quad cell 314 in the second module.

This second module 307 also comprises a second laser 304 that can send laser-based information, via its beam, back to the first module 302. This second laser 304 passes a beam through the first and second gimbal mirrors 306. The beam then passes through the first beam splitter in the first module and reaches the quad cell 314 in the first module and a receiver 316 in the first module.

The present invention in various embodiments comprises a system for transmitting and receiving underwater laser-mediated communications, which may be referred to herein as "ULTRA."

Figure 4:
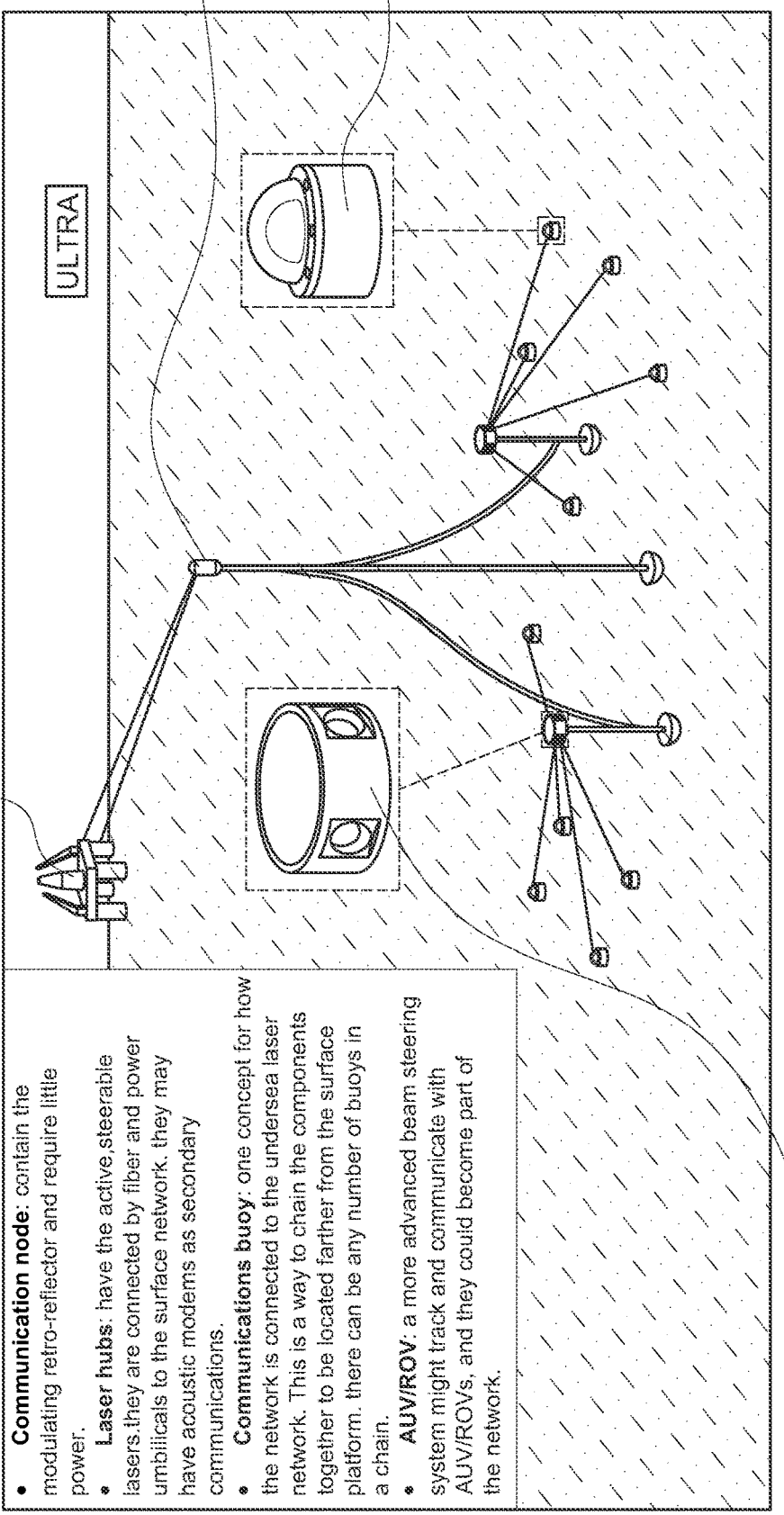
FIG. 4 illustrates an underwater network architecture comprising both sensors and laser nodes, according to an embodiment of the present invention.

Turning now to FIG. 4, a non-limiting example of ULTRA is shown. ULTRA may comprise one or more communications nodes 402, one or more laser hubs 404, one or more communications buoys 406, and optionally an AUV/ROV (Autonomous Underwater Vehicle/Remote Operated Vehicle) to transmit data from ULTRA to the surface.

Each communication node 402 comprises, in part, a modulating retroreflector. Each laser hub 404 comprises, in part, one or more lasers that are connected by cables to an above-water and/or surface network. A given laser hub may further comprise one or more acoustic modems as secondary communications devices.

The one or more communications buoys 406 chain the laser hubs together underwater with cables (for example fiber optic cables and power umbilicals). The communications buoy is itself connected to an above-water and/or surface platform 408, thereby connecting all of the components of the ULTRA system together. As a non-limiting example, the buoy could be connected to the platform 408 via cable and/or radio link. Additionally, the communications buoy may be located a customizable distance from the platform. It should be appreciated that, although communications buoys currently exist that can be tethered, via, for instance, fiber-optic cables, to underwater infrastructure, the ULTRA system enables connection of these buoys to more components and/or devices than what is currently possible.

One of skill in the art will appreciate that any number of communication nodes and/or laser hubs can be connected to a given communication buoy, and any number of communications buoys can be connected to a given platform. In such a fashion, the ULTRA system is scalable to larger networks.

Figure 5:
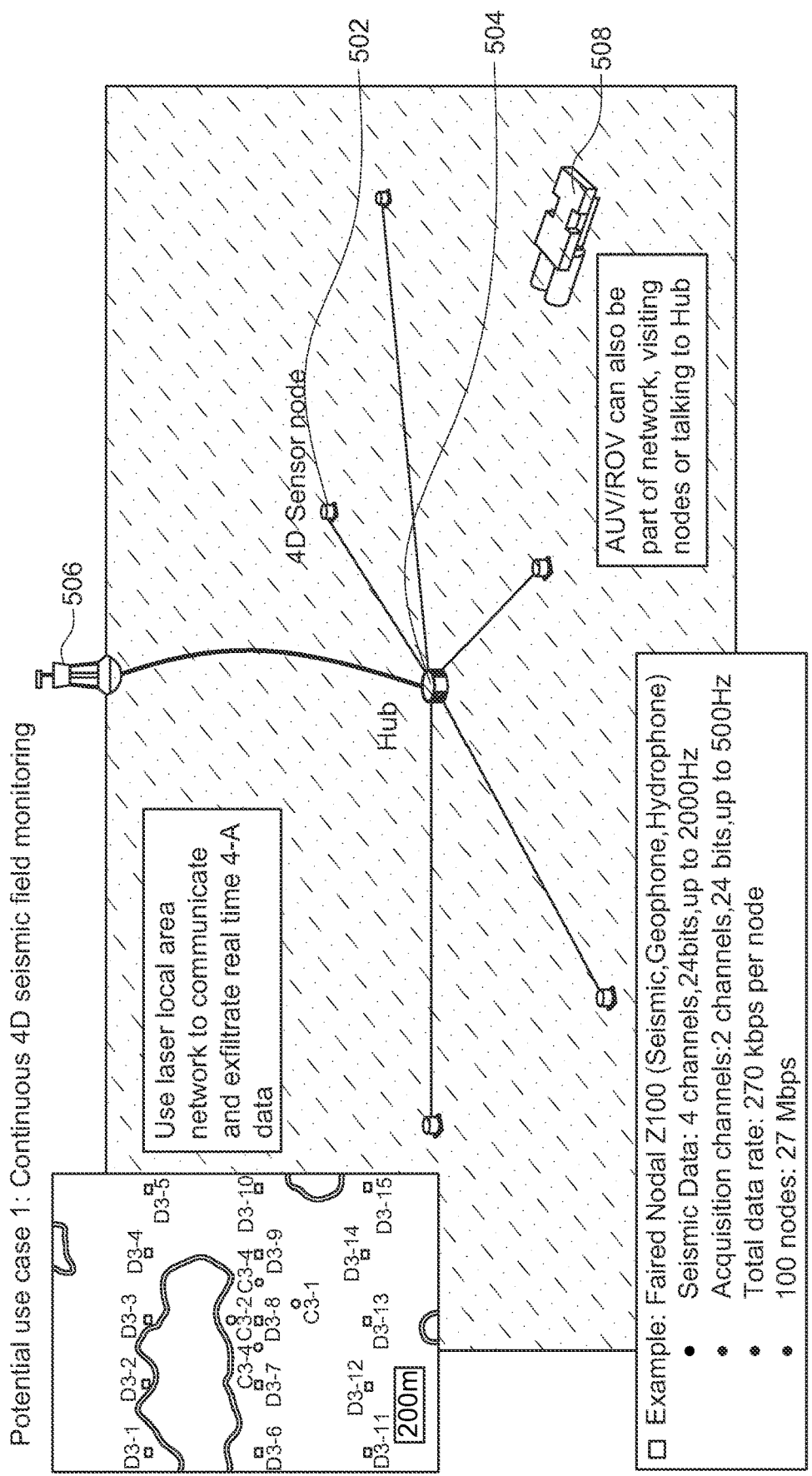
FIG. 5 illustrates an underwater network architecture for underwater seismic monitoring, according to an embodiment of the present invention.

FIG. 5 illustrates a non-limiting use example of an ULTRA system, according to an embodiment of the present invention. The ULTRA system may be used for continuous 4D seismic field monitoring. In this example, the communication nodes are 4D sensor nodes 502 that can collect real-time seismic data and relay it to the central hub 504 which can transmit it over the umbilical uplink to the surface infrastructure 506. Each 4D sensor node 502 shown may represent a series of 4D nodes linked together through multiple ULTRA relays. The ULTRA system shown can collect data on four channels at 24 bits, and up to 2000 Hz, with two acquisition channels at 24 bits, and up to 500 Hz. The total data collection rate is 270 Kbps per node. An AUV/ROV 508 is also part of this ULTRA system, and can be used to visit nodes 502 or talk to the laser hub 504. The communication nodes 502 are queried by the laser hub 504 at regular intervals and send back their collected data using their retro-reflectors.

Figure 6:
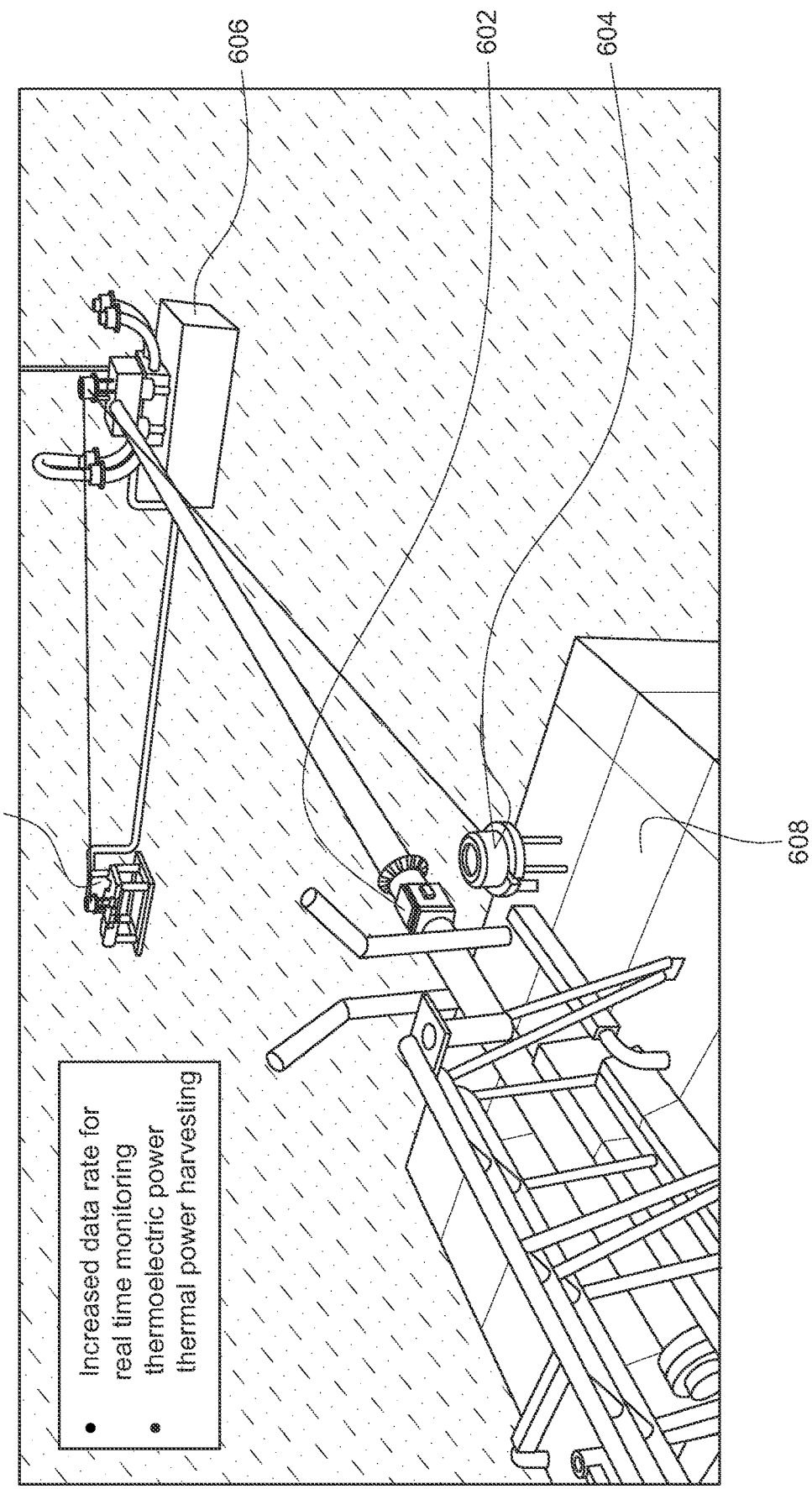
FIG. 6 illustrates an underwater network architecture for monitoring and/or relaying communications, according to an embodiment of the present invention.

FIG. 6 illustrates another non-limiting use example of an ULTRA system, according to an embodiment of the present invention. This example depicts a use scenario in which a full-time residency network is set up on well hardware using thermoelectric energy as a power source. One of skill in the art will recognize that such a setup is not feasible with current optical communications technologies. In other words, the ULTRA system depicted is powered by a thermoelectric generator 602 that uses thermoelectric power from thermal power harvesting, which utilizes an existing temperature differential (e.g., between a hot oil pipe and the cold sea floor) to generate electricity using a semiconductor sandwich. In this use scenario, the ULTRA system again comprises one or more communications nodes 604 that can collect data and transmit such data to a laser hub 606, which is in turn connected to, and can relay the data to, surface infrastructure 608. The ULTRA system shown may be used for subsea system monitoring, with one or more communications nodes that enable real-time monitoring of underwater and/or subsea conditions. The communications hubs transmit their monitoring data to the laser hub via their retro-reflectors.

Figure 7:
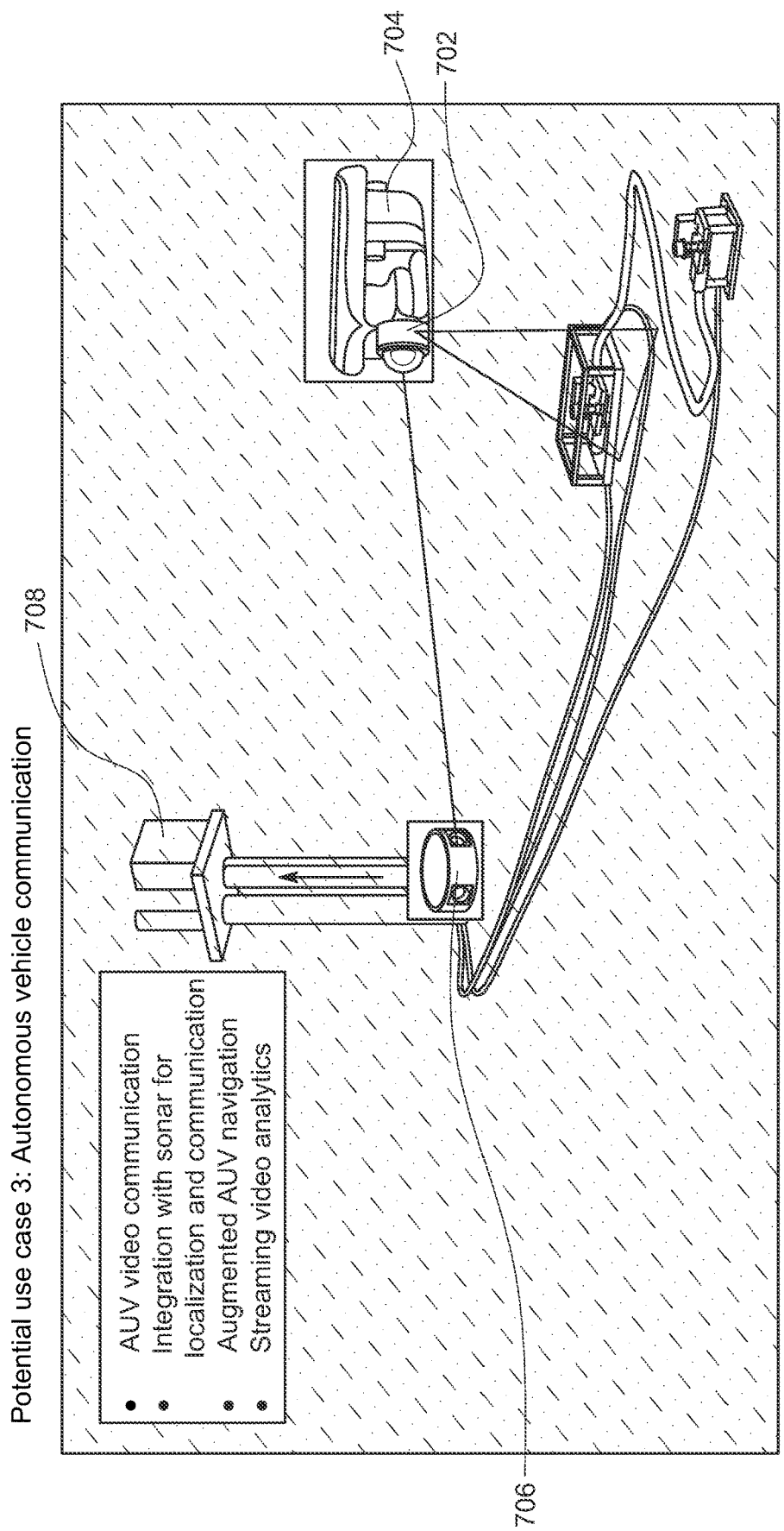
FIG. 7 illustrates an underwater network architecture for monitoring and/or communicating with underwater vehicles, according to an embodiment of the present invention.

FIG. 7 illustrates a further non-limiting use example of an ULTRA system, according to an embodiment of the present invention. This example depicts a use scenario for tetherless operation of AUV/ROV assets at a well site. As shown, the ULTRA system may be used for autonomous vehicle communications, with one or more communications nodes 702 located on the autonomous vehicle 704. The vehicle can then conduct video surveillance of, for instance, the ocean or sea floor, which is then communicated to the laser hub 706, which is linked to an above-water and/or surface platform 708. Such a system enables augmented navigation of the vehicle as well as streaming video analytics. A skilled artisan will further recognize that such a system is advantageous over current state-of-the-art systems because it eliminates the need for a tether/umbilical for the AUV/ROV 704, preventing potentially dangerous and costly umbilical snags on environmental obstacles. In the illustrated use example, sonar may be required for localization, in which case each of the one or more communications nodes 702 would be fitted with an acoustic receiver.

As an additional non-limiting example, an ULTRA system according to an embodiment of the present invention may comprise, for instance, one or more lasers having a wavelength of 450 nm, up to 80 mW of transmitted power, a 100Base-FX standard encoding which is 4B5B (reference: https://en.wikipedia.org/wiki/4B5B), modulation at 31.25 MHz, and an effective transmission at 100 Mbits/second. The ULTRA system may further comprise a PIN diode as a receiver at each communications node, which is connected to a standard amplifier and demodulator. The amplifier and demodulator modify existing 100Base-FX media transceivers. Each communications node may have multiple sets of transmitters and receivers. One of skill in the art will recognize that the one or more lasers transmitting data looks like a fiber optic cable to the electronics, with the laser driver modified to level-shift the laser-modulating signal to match the required input of the laser diode. In other words, current telecommunications equipment can be adapted by appropriate translation electronics to operate underwater in embodiments of the present invention.

Turning now to FIGS. 8-12, systems and methods for laser-based communications are shown. It should be appreciated that such systems and methods may be used to send information and/or data, which may, in some instances, be encoded, across a variety of media (e.g., air, water, etc.).

Figure 8:
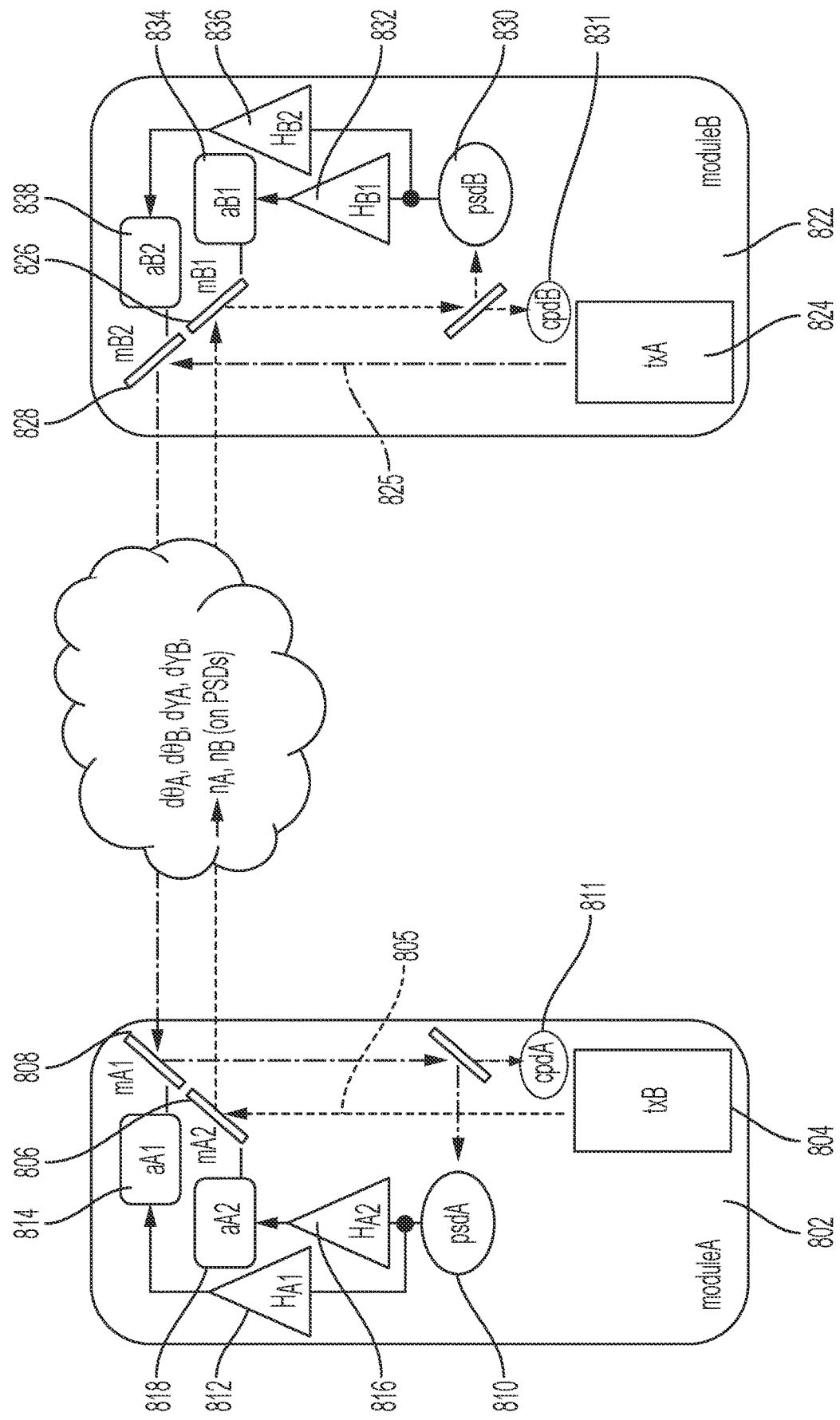
FIG. 8 illustrates laser-based communications between two communications systems, according to an embodiment of the present invention.
Figure 9:
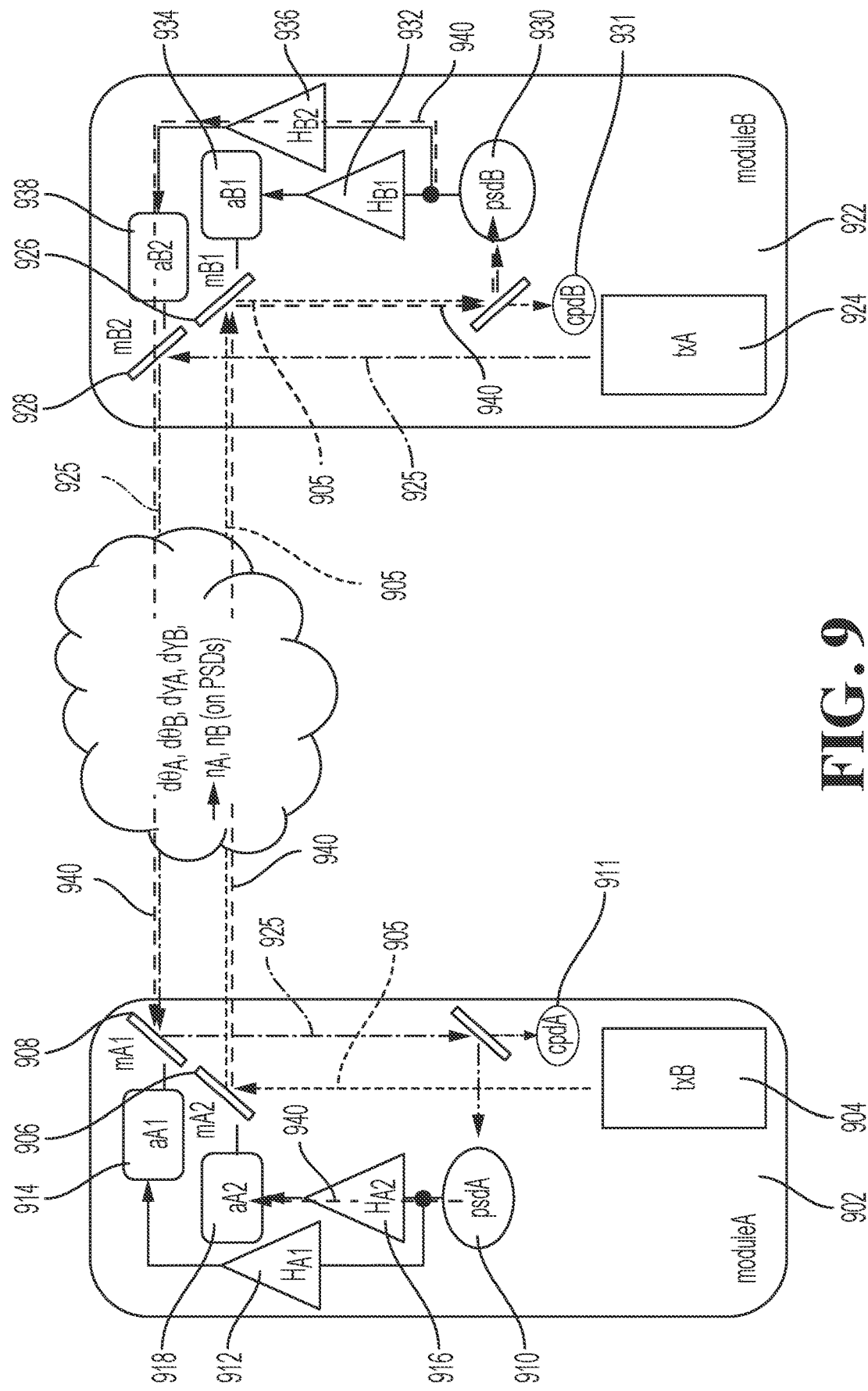
FIG. 9 illustrates laser-based communications between two communications systems, according to a further embodiment of the present invention.

In FIG. 8, a first communications system 802 and a second communications system 822 are depicted. The first communications system 802 comprises a transmitter 804 that sends an outgoing laser beam 805 that contacts a first steering mirror 806 to direct the laser beam to the second communications system 822. The communications system 802 further comprises a second steering mirror 808 that receives an incoming laser beam 825 sent from the second communications system 822.

A Position Sensitive Detector (PSD) 810 obtains the positioning and/or steering information of the incoming laser beam 825 and provides control signals 812 and 816 to actuators 814 and 818, respectively. These control signals are derived from PSD signals (from PSD 810) and adjust the angle of both steering mirrors 806 and 808 to control the steering and/or position of both the incoming and outgoing laser beams so that they match. For instance, the actuators 814 and 818 can adjust the steering mirrors so that they move in the same direction to match the incoming and outgoing laser beam positions. As used in the description herein, the term "match" includes, but is not limited to, (1) ensuring (e.g., via the PSD 810) that a position and/or angle of an outgoing laser beam is directed at a same point and/or location (e.g., ensuring that the laser beam 805 is directed at a same point and/or location of the second communications system 822), even despite potential movement or motion of the incoming and/or outgoing laser beams, and (2) ensuring (e.g., via the PSD 810) that an incoming laser beam is aligned on a communications photodiode (CPD).

The second communications system 822 is arranged, and functions, similarly to the first communications system 802. The system 822 comprises a transmitter 824 that sends the laser beam 825 so that it contacts a steering mirror 828 to direct this laser beam to the first communications system 802. The system 822 further comprises another steering mirror 826 that receives the laser beam 805 from the first communications system 802. A PSD 830 obtains the positioning and/or steering information of incoming laser beam 805 and provides control signals 832 and 836 to actuators 834 and 838, respectively. The control signals are derived from PSD signals (from PSD 830) and adjust the angle of both steering mirrors 826 and 828 to control the steering and/or position of both the incoming and outgoing laser beams so that they match. For instance, the actuators 834 and 838 can adjust the steering mirrors so that, e.g., they move in the same direction so as to match the incoming and outgoing laser beam positions. The PSD 830 also ensures that the laser beam 805 from the first communications system 802 is aligned on a CPD 831.

A skilled artisan will appreciate that the position and/or steering information of an incoming laser beam may be received by a given communications system and utilized to direct an outgoing laser beam of a second communications system. Thus, turning to FIG. 9, a first communications system 902 and a second communications system 922 are shown. The first communications system 902 comprises a transmitter 904 that sends an outgoing laser beam 905 that contacts a first steering mirror 906 to direct the laser beam to the second communications system 922. The communications system 902 further comprises a second steering mirror 908 that receives an incoming laser beam 925 sent from the second communications system 922. Similarly, the second communications system 922 comprises a transmitter 924 that sends a laser beam 925 that contacts a steering mirror 928 to direct the laser beam to the first communications system 902. The system 922 further comprises an additional steering mirror 926 that receives the incoming laser beam 905 sent from the first communications system 902.

A PSD 910 on the first communications system obtains the positioning and/or steering information of the incoming laser beam 925 and provides control signals 912 and 916 to actuators 914 and 918, respectively. In particular, the control signal 916 instructs the actuator 918 to adjust the position of the steering mirror 906 that directs the outgoing laser beam 905. As a result, the steering mirror 906 can be positioned to direct the laser beam 905 in a way that is in accordance with the signals from the PSD 910. The PSD 910 also ensures that the incoming laser beam 925 is aligned on a communications photodiode (CPD) 911.

After the laser beam 905 is sent to the second communications system 922, where the laser beam 905 contacts steering mirror 926, a PSD 930 then obtains the positioning and/or steering information of laser beam 905 and provides control signals 932 and 936 to actuators 934 and 938, respectively. Specifically, the control signal 936 instructs the actuator 938 to adjust the position of the steering mirror 928 that directs the outgoing laser beam 925. As a result, the steering mirror 928 on the second communications system 922 can be positioned to direct the laser beam 925 in a way that is in accordance with the signals from the PSD 910 on the first communications system 902. The PSD 930 also ensures that the laser beam 925 is aligned on a CPD 931. It should therefore be appreciated that there is a feedback loop that enables pointing of the laser beam 925, with the steering mirror 928 on the second communications system 922, to always land on a fixed point on PSD 910 of the first communications system in the presence of external position and/or angle noise [NUMBER-cloud]. In other words, positioning and/or steering information from any given incoming laser beam can be used to direct an outgoing laser beam, which then leads to the original incoming laser beam being steered as well. Accordingly, feedback loop 940 depicts information flow from positioning and/or sensing of an incoming laser beam on the first communications system 902 (done by the PSD 910) through actuator 918 that adjusts the steering mirror 906 to direct the passage of outgoing laser beam 905 to the second communications system 922, followed by the detection of positioning and/or sensing information of that beam 905 (done by PSD 930) through actuator 938 to adjust the steering mirror 928 to direct the laser beam 925 back to the first communications system 902.

It should be appreciated that such pointing as described above requires actuation of the two steering mirrors on each communications system (such as, for instance, the steering mirrors 906 and 908 on system 902, and the steering mirrors 926 and 928 on system 922) to be coupled together and/or to move together such that steering of both an incoming and an outgoing laser beam, due to offsets detected in the PSD, happen in the same direction.

Figure 10:
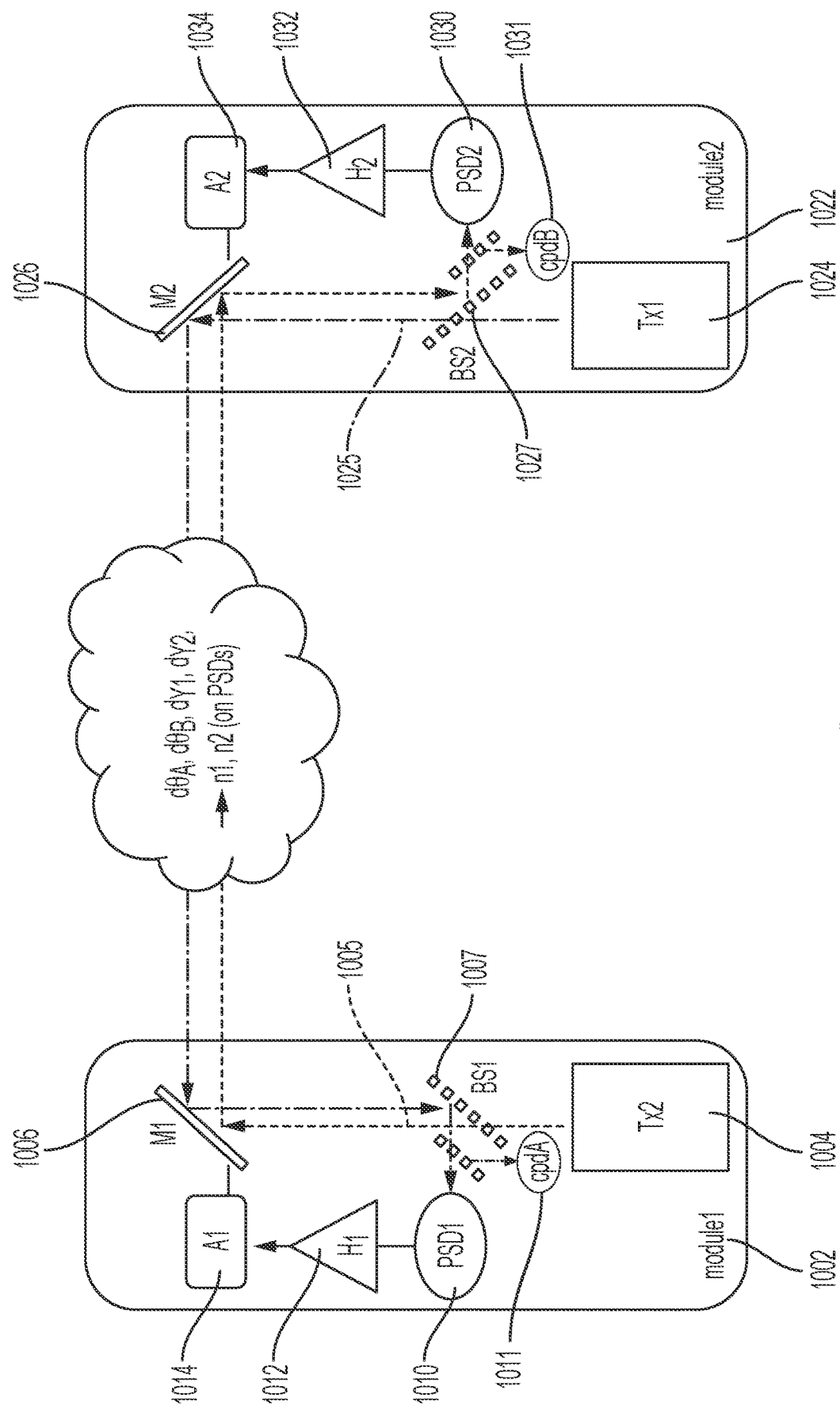
FIG. 10 illustrates laser-based communications between two communications systems where each communications system comprises a single steering mirror, according to an embodiment of the present invention.

Turning now to FIG. 10, a first communications system 1002 and a second communications system 1022 are shown, in which each communications system comprises a single steering mirror. The system 1002 comprises a transmitter 1004 that sends an outgoing laser beam 1005 that contacts the steering mirror 1006 to direct the laser beam to the second communications system 1022. The communications system 1002 further comprises a PSD 1010 that obtains the positioning and/or steering information of an incoming laser beam 1025 and provides a control signal 1012 to actuator 1014, which controls the steering mirror 1006. The control signal is derived from signals from the PSD 1010 and adjusts the angle of the mirror 1006 to control the steering and/or position of the outgoing laser beam 1005 so that it matches that of the incoming laser beam 1025. The PSD 1010 also ensures that the incoming laser beam 1025 is aligned on a communications photodiode (CPD) 1011.

Similarly, the second communications system 1022 comprises a transmitter 1024 that sends the laser beam 1025 that contacts the steering mirror 1026 to direct the laser beam back to the first communications system 1002. The communications system 1022 further comprises a PSD 1030 that obtains the positioning and/or steering information of the incoming laser beam 1005 and provides a control signal 1032 to actuator 1034, which controls the steering mirror 1026. The control signal is derived from signals from the PSD 1030 and adjusts the angle of the mirror 1026 to control the steering and/or position of the outgoing laser beam 1025 so that it matches that of the incoming laser beam 1005. The PSD 1030 also ensures that the incoming laser beam 1005 is aligned on a CPD 1031.

A skilled artisan will appreciate that laser beams 1005 and 1025 can be spatially separated such that they do not overlap or intersect, despite contacting the same mirror (e.g., mirror 1006 and 1026). However, it will be appreciated that such laser beams can be allowed to overlap so that they are separated in front of each system's respective transmitter by a dichroic beam splitter (splitter 1007 for first communications system 1002 and splitter 1027 for second communications system 1022).

As with FIG. 10, FIG. 11A shows a first communications system 1102 and a second communications system 1122. The system 1102 comprises a transmitter 1104 that sends an outgoing laser beam 1105 that contacts the steering mirror 1106 to direct the laser beam to the second communications system 1122. The communications system 1102 further comprises a PSD 1110 that obtains the positioning and/or steering information of an incoming laser beam 1125 and provides a control signal 1112 to actuator 1114, which controls the steering mirror 1106. The control signal is derived from signals from the PSD 1110 and adjusts the angle of the mirror 1106 to control the steering and/or position of the outgoing laser beam 1105 so that it matches that of the incoming laser beam 1125. The PSD 1110 also ensures that the incoming laser beam 1125 is aligned on a communications photodiode (CPD) 1111.

Similarly, the second communications system 1122 comprises a transmitter 1124 that sends the laser beam 1125 that contacts the steering mirror 1126 to direct the laser beam back to the first communications system 1102. The communications system 1122 further comprises a PSD 1130 that obtains the positioning and/or steering information of the incoming laser beam 1105 and provides a control signal 1132 to actuator 1134, which controls the steering mirror 1126. The control signal is derived from signals from the PSD 1130 and adjusts the angle of the mirror 1126 to control the steering and/or position of the outgoing laser beam 1125 so that it matches that of the incoming laser beam 1105. As with FIG. 10, dichroic beam splitters 1107 and 1127 may also be present. The PSD 1130 also ensures that the incoming laser beam 1105 is aligned on a CPD 1131.

Figure 11:
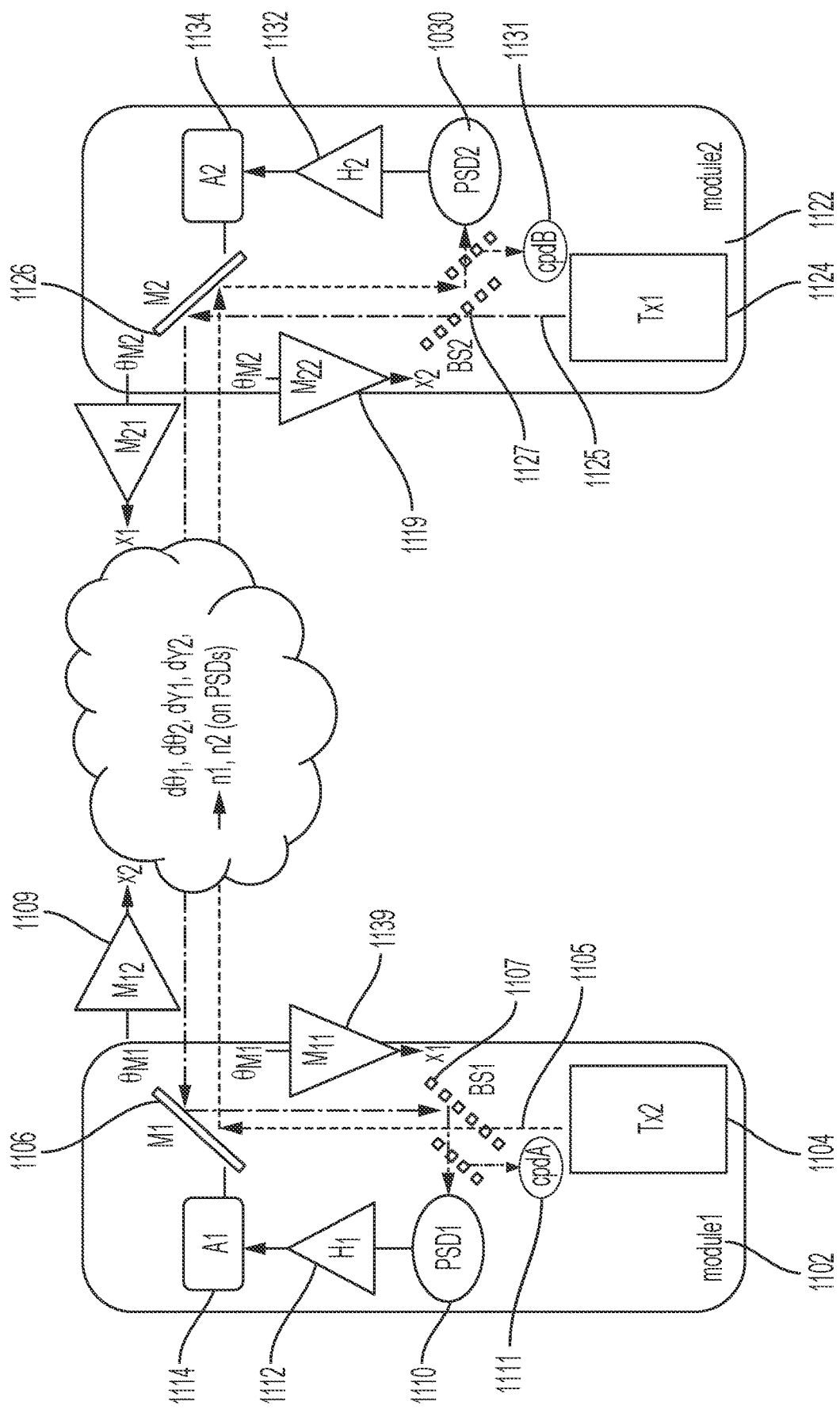
FIG. 11 illustrates mirror angles, position detector signals, and the relationships between them, for laser-based communications between two communications systems where each communications system comprises a single steering mirror, according to an embodiment of the present invention.

The effect of the various mirror angles on the two laser beams are also shown in FIG. 11. Specifically, effect 1109 is caused by the contact of laser beam 1105 with the steering mirror 1106 before being sent to the second communications system 1122. Contact of this laser beam with steering mirror 1126 in the second communications system results in effect 1119. Similarly, effect 1129 is caused by the contact of laser beam 1125 with the steering mirror 1126 before being sent to the first communications system 1102. Contact of this laser beam with steering mirror 1106 in the first communications system results in effect 1139.

In at least further embodiments, the invention enables loop suppression of noise. The equations governing this suppression are as follows. Assuming:

$$\mathcal{L}_1 \equiv M_{11}H_1,$$

$$\mathcal{L}_2 \equiv M_{22}H_2,$$

$$\mathcal{L}_{12} \equiv M_{12}H_1,$$

$$\mathcal{L}_{21} \equiv M_{21}H_2.$$

Then:

$$x_1 = \frac{\mathcal{L}_{21}n_2 + (1-\mathcal{L}_2)n_1}{\left[1 - \frac{\mathcal{L}_{12}\mathcal{L}_{21}}{(1-\mathcal{L}_1)(1-\mathcal{L}_2)}\right](1-\mathcal{L}_1)(1-\mathcal{L}_2)},$$

-continued $$x_2 = \frac{\mathcal{L}_{12}n_1 + (1-\mathcal{L}_1)n_2}{\left[1 - \frac{\mathcal{L}_{12}\mathcal{L}_{21}}{(1-\mathcal{L}_1)(1-\mathcal{L}_2)}\right](1-\mathcal{L}_1)(1-\mathcal{L}_2)}.$$

Accordingly, the conditions for loop stability must simultaneously satisfy:

$$\frac{\mathcal{L}_{12}\mathcal{L}_{21}}{(1-\mathcal{L}_1)(1-\mathcal{L}_2)} \neq 1,$$

$$\mathcal{L}_1 \neq 1,$$

$$\mathcal{L}_2 \neq 1.$$

where the notation $\mathcal{L} \neq 1$ means that the transfer function, L, must cross unity gain with at least some phase margin (a phase shift greater than $-360°$).

A skilled artisan will appreciate that multiple applications require communication systems that transmit radiation (e.g., laser beams) to precisely point this radiation at each other. Active control of the relative pointing between communications systems is therefore required to counteract any disturbances (e.g., due to distance between the systems). In at least some of the embodiments described above herein, such active control is achieved through the use of local control signals (i.e., the control signals provided by the PSDs to control the actuators), meaning that control signals need not be sent between the two communications systems.

It should be appreciated that more potential use examples than those described herein are possible. For instance, the present invention in its various embodiments may be custom modulated to better cope with underwater physics, such as, for example, backscatter, objects falling or moving in the laser beam(s), and the like. An avalanche photodiode may also be utilized to receive fainter signals. Additionally, adaptive optics may be utilized to improve both transmission of the laser signal as well as reception of the laser signal. Active targeting and/or acquisition may also be used to automatically align the transmitter of the signal and the receiver. Further, machine vision may be utilized to aid in locating adjacent nodes during the automatic alignment process.

The various components of the present invention described herein may be coated with non-toxic, anti-biofouling coatings in order to improve function and lifespan. Additionally, the invention in its various embodiments can perform wide-area searches using broadened transmit beams and retroreflectors to find the receivers, then narrow down the one or more laser beams for high speed operations underwater. To find such receivers, a coarse search mode is utilized in order to find a nearby receiver with a wide field of regard. Once the receiver is found, the field of regard is narrowed until one or more laser beams is directed at the found receiver.

These and other objectives and features of the invention are apparent in the disclosure, which includes the above and ongoing written specification.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A system for transmitting information, the system comprising:
   a first communications unit and a second communications unit, each communications unit comprising a transmitter, a communications photodiode (CPD), one or more steering mirrors, a position sensitive detector (PSD), and one or more actuators,
   wherein the transmitter of the first communications unit comprises a laser for sending a laser beam to the second communications unit,
   wherein the transmitter of the second communications unit comprises a laser for sending a laser beam to the first communications unit,
   wherein the PSD of the first communications unit:
      obtains positioning and/or steering information from the laser beam incoming from the second communications unit, and
      controls positioning and/or steering of the laser beam of the first communications unit in order to, despite motions of the laser beams, (i) keep the laser beam of the first communications unit directed at the second communications unit and (ii) keep the laser beam from the second communications unit aligned on the CPD of the first communications unit, and
   wherein the PSD of the second communications unit:
      obtains positioning and/or steering information from the laser beam incoming from the first communications unit, and
      controls positioning and/or steering of the laser beam of the second communications unit in order to, despite the motions of the laser beams, (i) keep the laser beam of the second communications unit directed at the first communications unit and (ii) keep the laser beam from the first communications unit aligned on the CPD of the second communications unit,
   wherein:
   (i) a first steering mirror of the one or more steering mirrors of the first communications unit receives the laser beam incoming from the second communications unit, and wherein a second, separate steering mirror of the one or more steering mirrors of the first communications unit contacts the laser beam of the first communications unit before the laser beam of the first communications unit passes to the second communications unit, and/or
   (ii) a first steering mirror of the one or more steering mirrors of the second communications unit receives the laser beam incoming from the first communications unit, and wherein a second, separate steering mirror of the one or more steering mirrors of the second communications unit contacts the laser beam of the second communications unit before the laser beam of the second communications unit passes to the first communications unit.

2. The system of claim 1, wherein the first and the second steering mirrors of the first communications unit are coupled to move together such that steering of both an incoming and an outgoing laser beam, due to offsets detected in the PSD, happen in a same direction.

3. The system of claim 1, wherein the first and the second steering mirrors of the second communications unit are coupled to move together such that steering of both an incoming and outgoing laser beam, due to offsets detected in the PSD, happen in a same direction.

4. The system of claim 1, wherein the PSD of the first communications unit provides one or more control signals to the one or more actuators of the first communications unit, and wherein the PSD of the second communications unit provides one or more control signals to the one or more actuators of the second communications unit.

5. The system of claim 4, wherein the one or more control signals provided by the PSD of the first communications unit are derived from the positioning and/or steering information from the laser beam incoming from the second communications unit, and wherein the one or more control signals provided by the PSD of the second communications unit are derived from the positioning and/or steering information from the laser beam incoming from the first communications unit.

6. The system of claim 5, wherein the one or more actuators of the first communications unit act to control a position and/or an angle of at least one of the one or more steering mirrors of the first communications unit, and wherein the one or more actuators of the second communications unit act to control a position and/or an angle of at least one of the one or more steering mirrors of the second communications unit.

7. The system of claim 1, wherein the one or more steering mirrors of the first communications unit comprises a single steering mirror that contacts both the laser beam of the first communications unit and the laser beam incoming from the second communications unit simultaneously, and wherein the one or more steering mirrors of the second communications unit comprises a single steering mirror that contacts both the laser beam of the second communications unit and the laser beam incoming from the first communications unit simultaneously.

8. The system of claim 7, wherein the first and the second communications unit each comprises a dichroic beam splitter.

9. A method for laser-based communications, the method comprising:
   directing a first laser beam from a first communications unit to a second communications unit;
   directing a second laser beam from the second communications unit to the first communications unit;
   receiving the first laser beam by one or more steering mirrors of the second communications unit;
   obtaining positioning and/or steering information of the first laser beam;
   generating one or more control signals from the positioning and/or steering information of the first laser beam; and
   using the one or more control signals to control positioning and/or steering information of the second laser beam so that the second laser beam remains directed at the first communications unit,
   wherein the receiving the first laser beam further comprises receiving the first laser beam with a first steering mirror of the one or more steering mirrors of the second communications unit, and
   wherein the directing the second laser beam further comprises contacting the second laser beam with a second, separate steering mirror of the one or more steering mirrors of the second communications unit before passing the second laser beam to the first communications unit.

10. The method of claim 9, further comprising:
receiving the second laser beam by one or more steering mirrors of the first communications unit;
obtaining the positioning and/or steering information of the second laser beam;
generating one or more control signals from the positioning and/or steering information of the second laser beam; and
using the one or more control signals to control positioning and/or steering information of the first laser beam so that the first laser beam remains directed at the second communications unit.

11. The method of claim 9, wherein the obtaining is performed by a position sensitive detector (PSD) associated with the second communications unit.

12. The method of claim 10, wherein the obtaining the positioning and/or steering information of the second laser beam is performed by a position sensitive detector (PSD) associated with the first communications unit.

13. The method of claim 9, wherein the first laser beam and the second laser beam contact a same mirror of the one or more steering mirrors.

14. The method of claim 13, wherein the first laser beam and the second laser beam overlap on the same mirror, and the method further comprising:
separating the first laser beam and the second laser beam.

15. The method of claim 14, wherein the separating is performed by a dichroic beam splitter.

16. The method of claim 10, wherein the first laser beam and the second laser beam contact a same mirror of the one or more steering mirrors of the first communications unit.

17. The method of claim 16, wherein the first laser beam and the second laser beam overlap on the same mirror, and the method further comprising:
separating the first laser beam and the second laser beam.

18. A system for mutual pointing of laser beams, the system comprising:
a plurality of units, each of the plurality of units comprising at least one laser for sending a laser beam, one or more steering mirrors, and a position sensitive detector (PSD),
wherein each of the plurality of units sends an associated laser beam to at least one other unit in the plurality of units,
wherein the PSD of each of the plurality of units adjusts positioning and/or steering of the associated laser beam by obtaining positioning and/or steering information from laser beams sent by one or more other units in the plurality of units,
wherein, for each of the plurality of units:
(i) a first steering mirror in the one or more steering mirrors receives an incoming laser beam from the at least one other unit in the plurality of units, and
(ii) a second, separate steering mirror in the one or more steering mirrors contacts the associated laser beam before the associated laser beam passes to the at least one other unit in the plurality of units.

19. The system of claim 18, wherein the PSD of each of the plurality of units detects one or more positional offsets from the laser beams sent by the one or more other units, and wherein the PSD of each of the plurality of units uses the one or more positional offsets to adjust the associated laser beam in a same direction as the one or more positional offsets.

* * * * *